(12) United States Patent
Riemann

(10) Patent No.: US 10,569,522 B2
(45) Date of Patent: Feb. 25, 2020

(54) DYNAMIC LAYER SELECTION IN ADDITIVE MANUFACTURING USING SENSOR FEEDBACK

(71) Applicant: FORMALLOY, LLC, Spring Valley, CA (US)

(72) Inventor: Jeffrey L. Riemann, Spring Valley, CA (US)

(73) Assignee: FORMALLOY, LLC, Spring Valley, CA (US)

( * ) Notice: Subject to any disclaimer, the term of this patent is extended or adjusted under 35 U.S.C. 154(b) by 296 days.

(21) Appl. No.: 15/261,404

(22) Filed: Sep. 9, 2016

(65) Prior Publication Data

US 2018/0072000 A1     Mar. 15, 2018

(51) Int. Cl.

| | | |
|---|---|---|
| *B29C 64/393* | (2017.01) | |
| *B33Y 10/00* | (2015.01) | |
| *B22F 3/105* | (2006.01) | |
| *B33Y 30/00* | (2015.01) | |
| *B33Y 50/02* | (2015.01) | |
| *B29C 64/106* | (2017.01) | |
| *B29C 64/118* | (2017.01) | |
| *B29C 64/386* | (2017.01) | |

(52) U.S. Cl.
CPC ............ *B33Y 10/00* (2014.12); *B22F 3/1055* (2013.01); *B33Y 30/00* (2014.12); *B33Y 50/02* (2014.12); *B22F 2003/1056* (2013.01); *B29C 64/106* (2017.08); *B29C 64/118* (2017.08); *B29C 64/386* (2017.08); *B29C 64/393* (2017.08)

(58) Field of Classification Search
CPC .................................................... B29C 64/118
See application file for complete search history.

(56) References Cited

U.S. PATENT DOCUMENTS

| | | |
|---|---|---|
| 7,625,198 B2 | 12/2009 | Lipson et al. |
| 7,939,003 B2 | 5/2011 | Bonassar et al. |
| 8,636,938 B2 | 1/2014 | Bonassar et al. |
| 8,877,112 B2 | 11/2014 | Bonassar et al. |

(Continued)

FOREIGN PATENT DOCUMENTS

| | | |
|---|---|---|
| CN | 105658367 A | 6/2016 |
| EP | 2902175 A1 | 8/2015 |

(Continued)

OTHER PUBLICATIONS

ABS, Statistical Language—Measures of Central Tendency, Australian Bureau of Statistics, Jul. 3, 2013 (accessed Feb. 5, 2019), http://www.abs.gov.au/websitedbs/a3121120.nsf/home/statistical+language+-+measures+of+central+tendency (Year: 2013).*

(Continued)

*Primary Examiner* — William P Bell
*Assistant Examiner* — Andrew L Swanson
(74) *Attorney, Agent, or Firm* — Patterson + Sheridan, LLP

(57) ABSTRACT

The present disclosure relates to methods and systems for improving layer selection in additive manufacturing. In particular, the present disclosure relates to methods and systems for improving layer selection in additive manufacturing using sensor feedback. In some examples, the sensor may be a distance sensor, and design layers may be selected dynamically based on determined part layer heights after layer deposition.

17 Claims, 10 Drawing Sheets

(56) References Cited

U.S. PATENT DOCUMENTS

| | | |
|---|---|---|
| 9,242,031 B2 | 1/2016 | Bonassar et al. |
| 2004/0107019 A1 | 6/2004 | Keshavmurthy et al. |
| 2006/0156978 A1 | 7/2006 | Lipson et al. |
| 2006/0160250 A1 | 7/2006 | Bonassar et al. |
| 2011/0169193 A1 | 7/2011 | Bonassar et al. |
| 2013/0015596 A1 | 1/2013 | Mozeika et al. |
| 2013/0089642 A1 | 4/2013 | Lipson et al. |
| 2014/0117586 A1 | 5/2014 | Bonassar et al. |
| 2015/0076739 A1* | 3/2015 | Batchelder ............. B33Y 10/00 264/401 |
| 2015/0084238 A1 | 3/2015 | Bonassar et al. |
| 2015/0108096 A1 | 4/2015 | Daniel |
| 2015/0147424 A1* | 5/2015 | Bibas ................. B29C 67/0088 425/150 |
| 2015/0217519 A1 | 8/2015 | Otten |
| 2015/0266242 A1* | 9/2015 | Comb .................. B29C 64/393 264/40.1 |
| 2016/0095959 A1 | 4/2016 | Bonassar et al. |
| 2016/0279881 A1* | 9/2016 | Okamoto .............. B29C 64/112 |
| 2016/0349724 A1* | 12/2016 | Cortes .................... B33Y 50/02 |

FOREIGN PATENT DOCUMENTS

| | | |
|---|---|---|
| NL | 2012198 C | 8/2015 |
| WO | 2006020685 A2 | 2/2006 |
| WO | 2006020685 A3 | 5/2007 |
| WO | 2015059533 A1 | 4/2015 |
| WO | 2015142492 A1 | 9/2015 |
| WO | 2016/064369 A1 | 4/2016 |

OTHER PUBLICATIONS

Lee, K. & Jee, H. J Mech Sci Technol (2015) 29: 5139. https://doi.org/10.1007/s12206-015-1113-y (Year: 2015).*

* cited by examiner

DYNAMIC LAYER SELECTION IN ADDITIVE MANUFACTURING USING SENSOR FEEDBACK

BACKGROUND

The present disclosure relates to additive manufacturing systems and methods for printing three-dimensional (3D) parts. In particular, the present disclosure relates to methods and systems for improving layer selection in additive manufacturing using sensor feedback.

Additive manufacturing systems, such as 3D printers, may be used to build three-dimensional parts from digital representations of the parts. Initially, a 3D design model or representation is created using appropriate modeling and design software. The output of the modeling software may be an STL file or the like. Then, the 3D model may be converted into a series of layers using software, such as "slicing" software. Thereafter, each layer may be processed to create machine-readable instructions for directing one or more elements of an additive manufacturing system along a specific path to create a particular layer. The machine-readable instructions may be in the form of, for example, G-code tailored to a specific type of additive manufacturing machine. After each layer of the part is created, the fully built part may be further finished, e.g., by machining, in order to bring the part into particular tolerances.

Examples of commercially available additive manufacturing techniques include extrusion-based techniques (e.g., Fused Deposition Modeling (FDM)), fusing or binding from a powder bed techniques (e.g., Selective Laser Sintering (SLS), Selective laser melting (SLM), and Electron beam melting (EBM)), lamination techniques, photopolymerization techniques (e.g., stereo lithography), powder- or wire-fed directed energy deposition (e.g., direct metal deposition (DMD), laser additive manufacturing (LAM), laser metal deposition (LMD)), and others.

SUMMARY

In some example, an additive manufacturing method includes: obtaining, from a sensor, a calibration measurement, the calibration measurement indicating a distance from the sensor to a build surface of an additive manufacturing apparatus; selecting a current design layer from a plurality of design layers representing a part to be additively manufactured; depositing, from a deposition element of the additive manufacturing apparatus, a material layer on the build surface corresponding to the current design layer; obtaining, from the sensor, a plurality of material layer measurements, each of the material layer measurements indicating a distance from the sensor to the material layer; determining, based on the plurality of material layer measurements and the calibration measurement, a height metric; and selecting a new design layer from the plurality of design layers based on the height metric.

In some examples, the additive manufacturing method further includes receiving process code, the process code defining the plurality of design layers.

In some examples, the additive manufacturing further includes: modifying the process code to include a plurality of layer flags, each layer flag being configured to uniquely identify a respective design layer of the plurality of design layers.

In some examples, the additive manufacturing method further includes: determining that no more design layers need to be deposited; and finishing the part by removing material from the part using a tool of the additive manufacturing apparatus.

In some examples, the additive manufacturing method further includes: identifying, based on at least one material layer measurement of the plurality of layer measurements, a portion of the material layer that requires correction.

In some examples, the additive manufacturing method further includes: removing material from the portion of the material layer that requires correction using the tool of the additive manufacturing apparatus.

In some examples, an additive manufacturing apparatus, includes: a user interface; a deposition element; a directed energy source; a material feed; a process motion system; a build surface motion system comprising a build surface; a distance sensor; a tool configured to remove material from a part being manufactured; a memory comprising a plurality of design layers representing a part to be additively manufactured; and a control system, wherein the control system is configured to execute program code and cause the additive manufacturing apparatus to: obtain, from the sensor, a calibration measurement, the calibration measurement indicating a distance from the sensor to the build surface of the additive manufacturing apparatus; selecting a current design layer from the plurality of design layers; depositing, from the deposition element, a material layer on the build surface corresponding to the current design layer; obtaining, from the sensor, a plurality of material layer measurements, each of the material layer measurements indicating a distance from the sensor to the material layer; determining, based on the plurality of material layer measurements and the calibration measurement, a height metric; and select a new design layer from the plurality of design layers based on the height metric.

In some examples, the control system of the additive manufacturing apparatus is further configured to cause the additive manufacturing apparatus to: receive process code, the process code defining the plurality of design layers.

In some examples, the control system of the additive manufacturing apparatus is further configured to cause the additive manufacturing apparatus to: modify the process code to include a plurality of layer flags, each layer flag being configured to uniquely identify a respective design layer of the plurality of design layers.

In some examples, the control system of the additive manufacturing apparatus is further configured to cause the additive manufacturing apparatus to: determine that no more design layers need to be deposited; and finish the part by removing material from the part using the tool.

In some examples, the control system of the additive manufacturing apparatus is further configured to cause the additive manufacturing apparatus to: identify, based on at least one material layer measurement of the plurality of layer measurements, a portion of the material layer that requires correction.

In some examples, the control system of the additive manufacturing apparatus is further configured to cause the additive manufacturing apparatus to: remove material from the portion of the material layer that requires correction using the tool.

In some examples, the height metric is an average or median layer height of the material layer. In other examples, the height metric is a height variance of the material layer. In other examples, the height metric is a total feature height.

In some examples, the sensor is a laser distance sensor.

In some examples, the additive manufacturing apparatus is a Powder Fed Directed Energy Deposition apparatus.

In some examples, the deposition element comprises a deposition nozzle or a feedstock guide.

DETAILED DESCRIPTION OF CERTAIN INVENTIVE EXAMPLES

Figure 1:
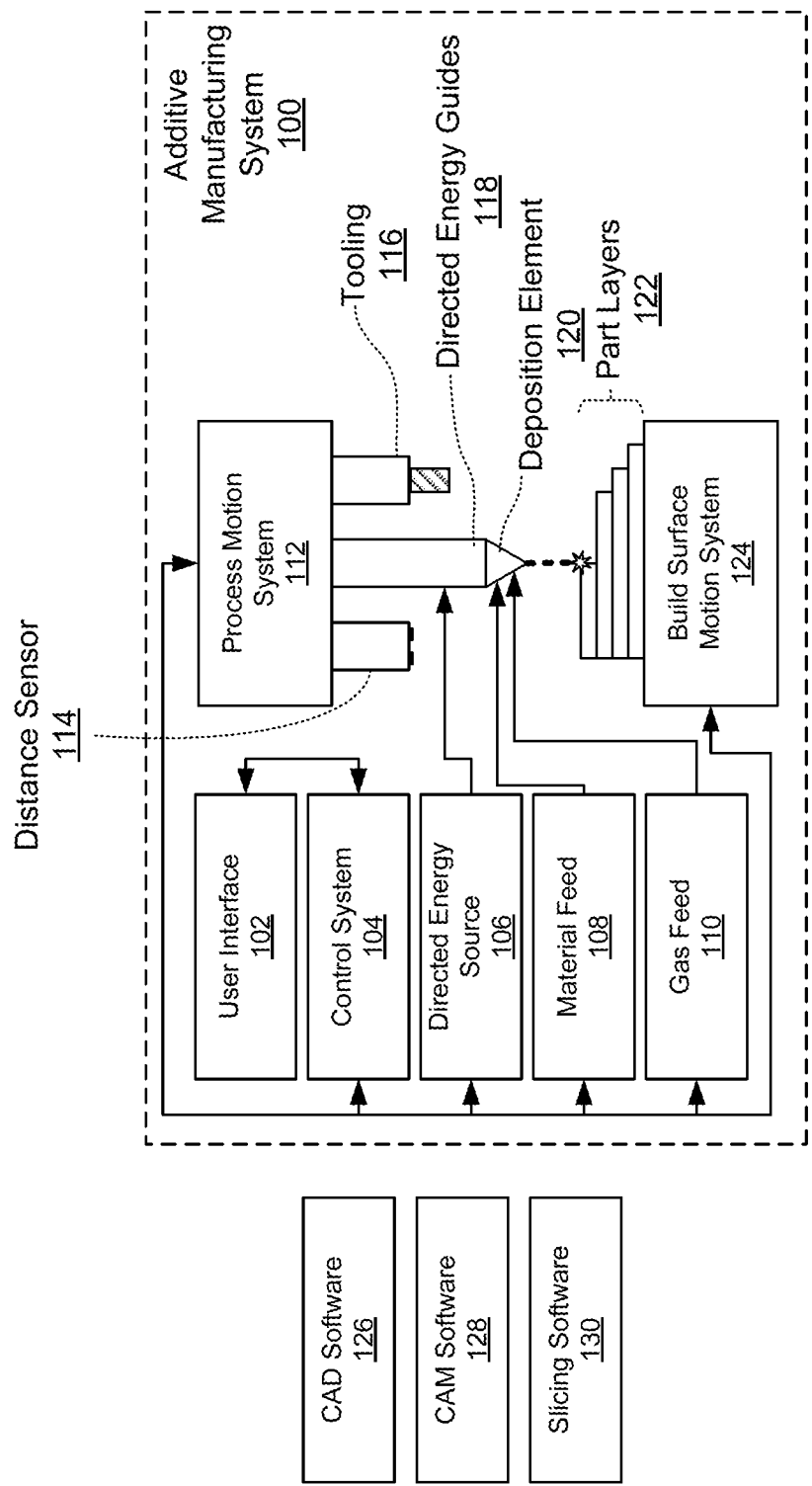
FIG. 1 depicts an example of selected aspects of an additive manufacturing system.

The present disclosure is directed to methods and systems for improving layer selection in additive manufacturing using sensor feedback.

As described above, additive manufacturing may include forming (e.g., by deposition) a plurality of part layers corresponding to a 3D design model or representation of a part to be manufactured. Each layer is then manufactured sequentially to form the part. In general, the 3D design model may be sliced into layers according to the expected layer height of the manufacturing material. For example, a particular material and a particular additive manufacturing technique may result in a particular material layer thickness, and this thickness may correspond to the thickness of the layers in the sliced 3D model.

Powder Fed Directed Energy Deposition (PFDED) is a type of additive manufacturing in which a high-power laser is used to melt metal powder supplied to the focus of a laser beam. The laser beam may be directed through the center of a deposition element and focused to a small spot by one or more optical elements, such as lenses. In some examples, metal powder may be delivered and distributed around the circumference of the deposition element while in others the metal powder may be split by an internal manifold and delivered through nozzles arranged in various configurations around the deposition element. PFDED may be used with a wide range of materials including titanium, stainless steel, aluminum, and other specialty materials as well as composites and functionally graded material. Further, PFDED may be used to fully build new parts as well as to add material to existing parts, for example for coatings, repair, and hybrid manufacturing applications.

A problem with additive manufacturing techniques, such as PFDED, is the consistency of the deposited material layers. For example, if the layers are of inconsistent thickness, then the overall part design may be compromised during manufacturing as the problem is propagated through subsequent layers. Historically, this problem has been dealt with by time consuming and often manual adjustment of layers. For example, after a layer is formed, that layer may be measured to see if the height and/or thickness of the layer corresponds with the sliced 3D model layer height and/or thickness. If a variance exists (i.e., the actual material layer varies in height and/or thickness from the model layer thickness), the 3D design model may require re-slicing to compensate for the variance in the deposited material layer height and/or thickness. Such manual resolution of manufacturing variances may negatively affect the time and cost of additive manufacturing compared to other possible manufacturing techniques.

A primary driver of the aforementioned problem with additive manufacturing techniques is the reliance on design models that have design layer thicknesses which approximate the thickness of the deposited material layers. Such design models may be considered to be "low-resolution" because normally a single design layer corresponds with a given deposited material layer. At the outset, a design model with, for example, a single design layer corresponding to each deposited material layer seems both simple and logical because it allows sequential identification of design layers for manufacture. However, because additive manufacturing normally results in some variance in the final built part (as compared to the model), the use of such models can result in large cumulative variances in the manufactured part. As the number of deposited layers increases, so too does the potential cumulative variance.

A solution to the problem of low-resolution design models is to use high-resolution design models i.e., models where many design layers correspond to a single deposited material layer. Using a high-resolution design model allows for dynamic selection of layers during the manufacturing process instead of being limited to sequential selection. As such, a more accurate design layer may be selected based on actual manufacturing results and not merely expected results. Consequently, manufacturing accuracy, speed, and quality may be improved without manual intervention.

FIG. 1 depicts an additive manufacturing system 100. Additive manufacturing system 100 includes a user interface 102. User interface 102 may be, for example, a graphical user interface comprising hardware and software controls for controlling additive manufacturing system 100. In some examples, user interface 102 may be integral with additive manufacturing system 100 while in other examples user interface 102 may be remote from additive manufacturing system 100 (e.g., on a remote computer such as a laptop computer or a personal electronic device).

Additive manufacturing system 100 also includes a control system 104. In this example, control system 104 is in data communication with user interface 102 as well as directed energy source 106, material feed 108, gas feed 110, distance sensor 114, process motion system 112, tooling 116, and build surface motion system 124. Control system 104 may include hardware and software for controlling various aspects of additive manufacturing system 100. For example, control system 104 may include one or more: processors, data storages, physical interfaces, software interfaces, software programs, firmwares, etc. in order to coordinate and control the various aspects of additive manufacturing system 100. In some examples, control system 104 may include network connectivity to various aspects of additive manufacturing system 100 as well as to external networks, such as the Internet and other networks, such as local area networks (LANs) and wide area networks (WANs). In some examples, control system 104 may be a purpose-built logic board, while in other examples control system 104 may be implemented by a generic computer with specific software components for controlling the various aspects of additive manufacturing system 100. The data connections shown between control system 104 and other aspects of additive manufacturing system 100 are exemplary only, and other implementations are possible.

Control system 104 may interpret commands received from user interface 102 and thereafter cause appropriate control signals to be transmitted to other aspects of additive manufacturing system 100. For example, a user may input data representing a part to be manufactured using additive manufacturing system 100 into user interface 102 and control system 104 may act upon that input to cause additive manufacturing system 100 to manufacture the part.

In some examples, control system 104 may compile and execute process code, such as G-code data, that causes aspects of additive manufacturing machine 100 to operate. For example, the process code may cause process motion system 112 or build surface motion system 124 to move. As another example, the process code may cause directed energy source 106, material feed 108, gas feed 110, or tooling 116 to activate or deactivate. Further, the process code may modulate the operation of the aforementioned aspects of additive manufacturing machine 100, such as by increasing or decreasing the power of directed energy source 106, increasing or decreasing the flow rate of material feed 108 or gas feed 110, increasing or decreasing the speed of tooling 116, etc.

Process motion system 112 may move elements of additive manufacturing system 100 to exact positions. For example, process motion system 112 may position deposition element 120 at an exact distance from a part layer 122 being manufactured. Similarly, process motion system 112 may position tooling 116 precisely to perform fine tooling operations on a part layer 122. Further, process motion system 112 may position distance sensor 114 precisely and provide a known reference location for distance measurements to one or more points on a part layer 122. Process motion system 112 may also report current positioning of elements of additive manufacturing system 100 to control system 104 for use in providing feedback during the additive manufacturing process.

Directed energy source 106 may provide any suitable form of directed energy, such as a laser beam (e.g., from a fiber laser) or an electron beam generator, which is capable of melting a manufacturing material, such as a metal powder or wire. Directed energy source 106 may interact with directed energy guides 118 in order to, for example, direct or focus a particular type of directed energy. For example, directed energy guides 118 may comprise one or more optical elements, such as mirrors, lenses, filters, and the like, configured to focus a laser beam at a specific focal point and to control the size of the focused laser point. In this way, the actual creation of the laser energy by directed energy source 106 may be located remote from the manipulation and focus of the laser energy by directed energy guides 118.

Directed energy source 106 may also be used to remove material from a manufactured part, such as by ablation.

Material feed 108 may supply building material, such as a metal powder or wire, to deposition element 120. In some examples, material feed 108 may be a remote reservoir including one or more types of raw material to be used by additive manufacturing system 100.

Deposition element 120 may be connected with material feed 108 and may direct material, such as metal powder or wire, towards a focal point of directed energy source 106. In this way, deposition element 120 may control the amount of material that is additively manufactured at a particular point in time. Deposition element may include nozzles, apertures, and other features for directing material, such as metal powder or wire, towards a manufacturing surface, such as a build surface or previously deposited material layer. In some examples, deposition element 120 may have controllable characteristics, such as controllable nozzle aperture sizes.

Gas feed 110 may be connected with deposition element 120 to provide propulsive force to the material provided by material feed 108. In some examples, gas feed 110 may modulate the gas flow rate to control material (e.g., powder) flow through deposition element 120 and/or to provide cooling effect during the manufacturing process.

Distance sensor 114 may be any sort of sensor capable of measuring distance to an object. In some examples, distance sensor 114 may be an optical distance sensor, such as a laser distance sensor. In other examples, distance sensor 114 may be an acoustic distance sensor, such as an ultrasonic sensor. In yet other examples, distance sensor 114 may be an electromagnetic distance sensor or a contact-based distance sensor.

Tooling 116 may be any form of machine tool, such as a tool for cutting, grinding, milling, lathing, etc. In the example depicted in FIG. 1, Tooling 116 may be moved into place by process motion system 112. In other examples, tooling 116 may be separate from, for example, deposition element 120 and distance sensor 114 but likewise controllable by control system 104.

Notably, while directed energy source 106, material feed 108, gas feed 110, directed energy guides 118, distance sensor 114, tooling 116, and deposition element 120 are shown in an example configuration in FIG. 1, other configurations are possible.

Process motion system 112 may control the positioning of one or more aspects of additive manufacturing system 100, such as distance sensor 114, deposition element 120, and tooling 116. In some examples, process motion system 112 may be movable in one or more degrees of freedom. For example, process motion system 112 may move and rotate deposition element 120, distance sensor 114, and tooling 116 in and about the X, Y, and Z axes during the manufacturing of part layers 122.

Build surface motion system 124 may control the positioning of, for example, a build surface upon which part layers 122 are manufactured. In some examples, build surface motion system 124 may be movable in one or more degrees of freedom. For example, build surface motion system 124 may move and rotate the build surface in and about the X, Y, and Z axes during the manufacturing of part layers 122. In some examples, the build surface may be referred to as a build plate or build substrate.

Computer-Aided Design (CAD) software 126 may be used to design a digital representation of a part to be manufactured, such as a 3D model. CAD software 126 may be used to create 3D design models in standard data formats, such as DXF, STP, IGS, STL, and others. While shown separate from additive manufacturing system 100 in FIG. 1, in some examples CAD software 126 may be integrated with additive manufacturing system 100.

Slicing software 130 may be used to "slice" a 3D design model into a plurality of slices or design layers. Such slices or design layers may be used for the layer-by-layer additive manufacturing of parts using, for example, additive manufacturing system 100.

Computer-Aided Manufacturing (CAM) software 128 may control machinery, such as machine tools, for use in manufacturing parts. CAM software 128 may be used to create, for example, G-Code, for the control of machine tools, such as tooling 116, or deposition tools, such as deposition element 120. For example, CAM software may create code in order to direct a manufacturing system, such as additive manufacturing system 100, to deposit a material layer along a 2D plane, such as a build surface, in order to build a part. For example, as shown in FIG. 1, part layers 122 are manufactured on (e.g., deposited on, formed on, etc.) build surface motion system 124 using process motion system 112 and deposition element 120.

In some examples, one or more of CAD software 126, CAM software 128, and Slicing Software 130 may be combined into a single piece or suite of software. For example, CAD or CAM software may have an integrated slicing function.

Figure 2:
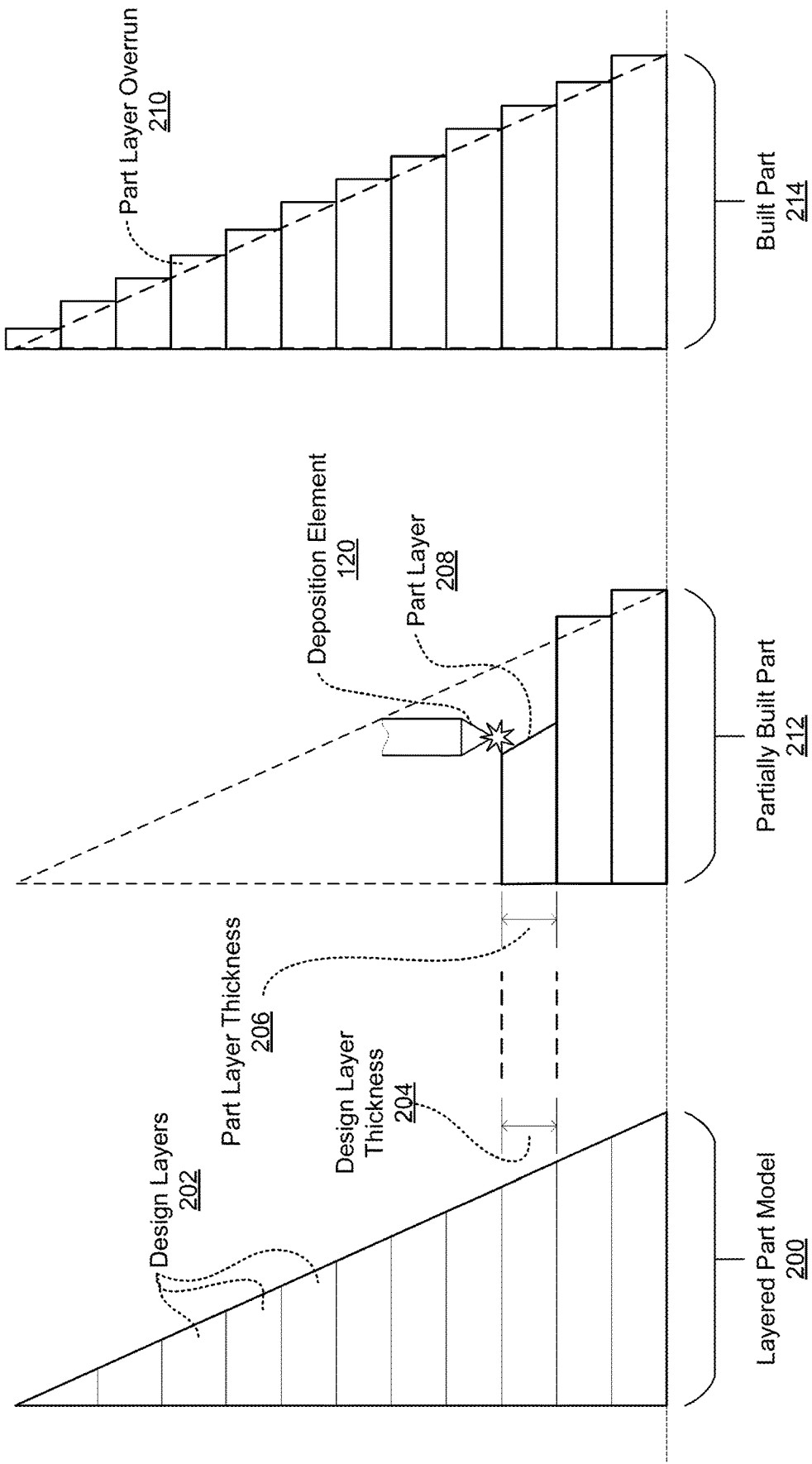
FIG. 2 depicts examples of additive manufacturing processes using a typical layered part model.

FIG. 2 depicts a layered part model 200 that comprises a plurality of design layers 202 having consistent design layer thicknesses 204.

FIG. 2 depicts a low-resolution layered part model wherein the design layer thickness 204 is set according to the particular material and the particular additive manufacturing technique being used. For example, if a particular manufacturing technique using a particular material results in an average part layer thickness 206 of 0.5 mm, then the layered part model 200 may be sliced purposefully into 0.5 mm layers. Here, the assumption is that each deposited part layer 208 will have a part layer thickness 206 consistent with the design layer thickness 204.

Partially built part 221 depicts a plurality of manufactured (e.g., deposited) part layers 208, which correspond with design layers 202 in layered part model 200. In particular, partially built part 212 depicts a part layer being manufactured (here, deposited) by deposition element 120. Part layers 208 are manufactured sequentially (i.e., layer-by-layer) in accordance with layered part model 200. In other words, when a particular part layer 208 is completed according to its corresponding design layer 202, then the next design layer 202 is selected and the next part layer 208 is manufactured. Notably, FIG. 2 depicts an ideal case in additive manufacturing wherein the thickness 206 of each deposited part layer 208 corresponds exactly to the thickness 202 of each design layer 202.

Built part 214 depicts the results of manufacturing each design layer according to layered part model 200. As depicted in FIG. 2, built part 214 includes part layer overruns 210 (i.e., where material is deposited beyond what the layered part model 200 calls for), which is typical of additive manufacturing processes. Often, parts, such as built part 214, will include part layer overruns 210 rather than part layer underruns (not shown) because it is easier to remove the excess material via machining or other subtractive process to bring the built part 214 back into conformance with respect to layered part model 200 than to add material to do the same.

Figure 3:
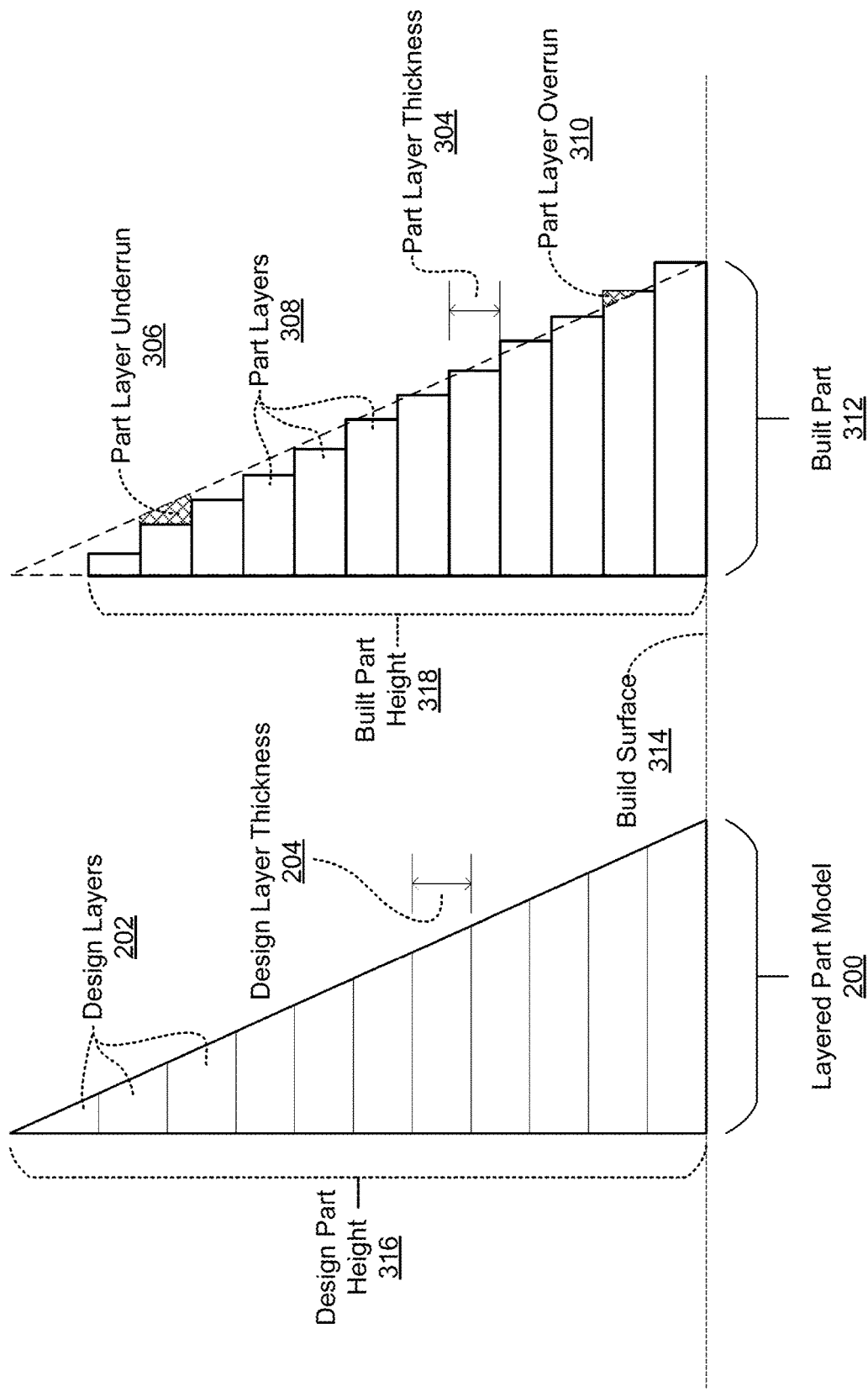
FIG. 3 depicts examples of additive manufacturing processes using a typical layered part model.

FIG. 3 depicts the same layered part model 200 from FIG. 2, but this time with a built part 312 that corresponds with a more realistic additive manufacturing result. In particular, here part layer thickness 302 varies from (is less than) design layer thickness 204. Consequently, the built part 312 ends up smaller than the layered part model 200. For example, if the variance in part layer thickness 302 is −0.1 mm for each of the 11 layers in layered part model 200, then the resulting built part height 318 will be approximately 1.1 mm short of the design part height 316.

Further, while built part 312 still includes part layer overruns 310 in the initial layers of the built part, it also includes part layer underruns 306 in the final layers of the built part due to the growing variance of part layer heights relative to a reference, such as build surface 314. Consequently, built part 312 does not fill the total volume of the layered part model due to the part layer thickness variance. In order to bring built part 312 into conformance with the layered part model, additional material would need to be added after the initial additive manufacturing in order to fill in the part layer underruns 306 (in addition to material needing to be removed on the part layer overruns 310).

Figure 4:
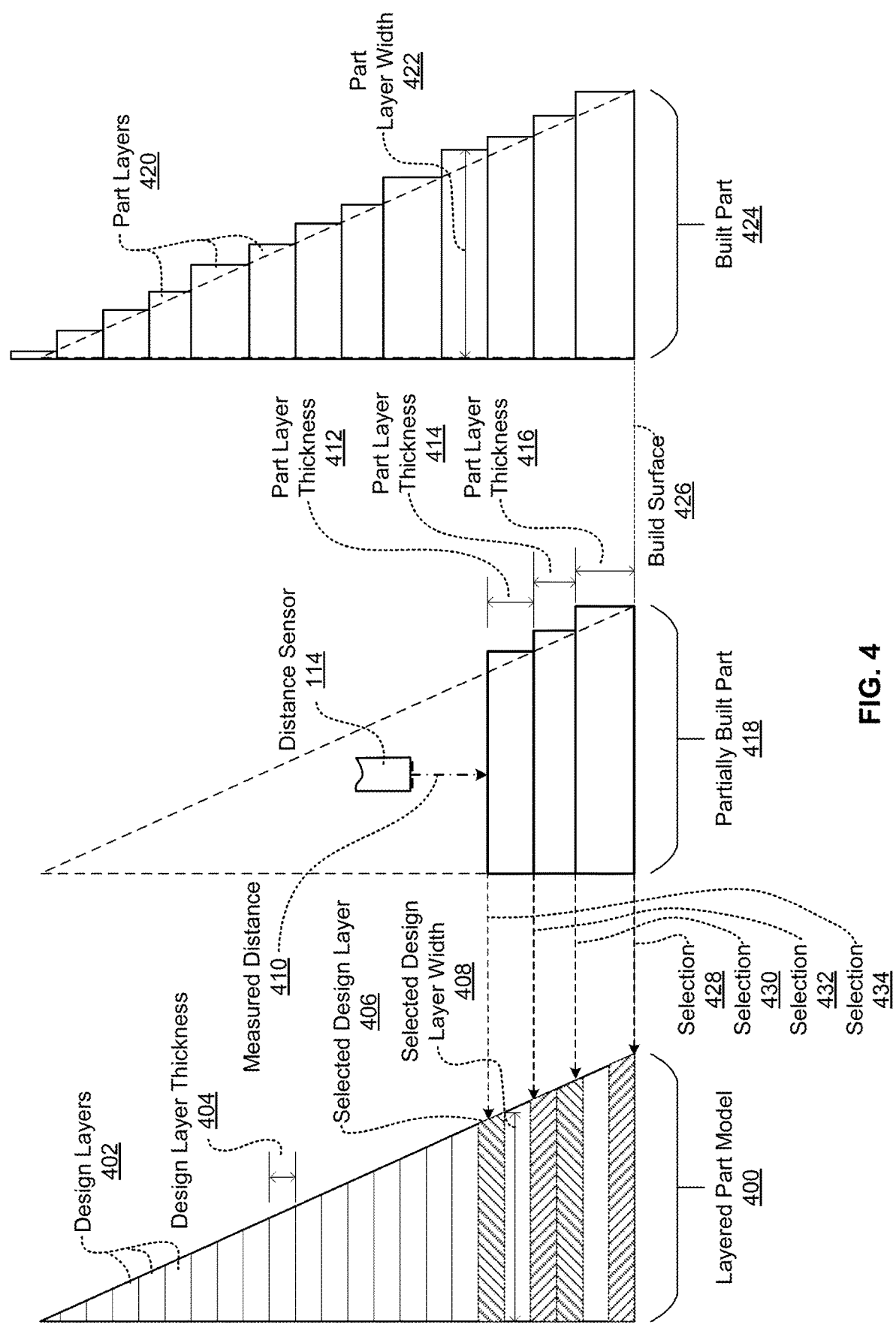
FIG. 4 depicts examples of additive manufacturing processes using a high-resolution layered part model.

FIG. 4 depicts a layered part model 400, which corresponds in outer dimension to layered part model 200 of FIG. 2, but which includes design layers 402 with a smaller design layer thickness 404. FIG. 4 thus depicts a high-resolution layered part model wherein design layers 402 of layered part model 400 are thinner than design layers 202 of layered part model 200. Notably, while design layers 402 are depicted as with design layer thicknesses 404 of approximately half or 50% of the thickness of the expected part layer thickness, this ratio is merely to simplify the drawing. In other examples, the design layer thickness 404 may be less than 50%, 40%, 30%, 20%, 10% (or other percentages) of the expected part layer thickness. For example, where an expected part layer thickness (i.e., deposition thickness) for an additive manufacturing process is 0.5 mm, the design layer thickness may be set to 0.1 mm (i.e., 20% of the expected part layer thickness).

Further, in FIG. 4, each part layer thickness (e.g., 412, 414, and 416) varies versus the design layer thickness 404 and versus the other part layers, unlike in FIG. 3 where a uniform variance in part layer thickness versus design layer thickness was depicted. Thus, in FIG. 4 each part layer thickness (412, 414, and 416) varies with respect to other part layer thicknesses and with respect to design layer thickness 404.

Importantly, design layer thickness 404 is intentionally chosen to be less than (i.e., thinner than) the expected thickness of a deposited part layer. Thus, the resolution of layered part model 400 is increased (i.e., there are many more design layers 402 in layered part model 400 than expected part layers).

The expected thickness of a manufactured (e.g., deposited) part layer may be determined by many means, including: by statistical calculation (e.g., based off a mean, median, or other statistical calculation based on a plurality of measured thicknesses of a plurality of deposited part layers); by model (e.g., based off a predictive manufacturing model), by reference (e.g., a manufacturer's reference for a part and/or material), and others. For example, each layer of a plurality of deposited part layers may be measured for its actual part layer thickness in order to determine a statistical expected thickness (e.g., an average thickness).

Distance sensor 114 may be used to measure the distance 410 between a known reference and the top of a deposited part layer. The known reference may be, for example, a known position of an element of an additive manufacturing machine, such as distance sensor 114 as determined by process motion system 112. In some examples, distance sensor 114 may be a point measurement sensor capable of performing a measurement between a known position and another point (e.g., where a laser falls on a part layer). In other examples, distance sensor 106 may be a line measurement sensor capable of performing a plurality of measurements between a known position and plurality of other points (e.g., arranged along a line or another geometric shape).

Distance sensor 114 may be used to measure distance between a known reference and one or more points of a deposited part layer. The measured distance 410 may be used to determine several characteristics of a deposited part layer, including: part layer thickness at a point, average part layer thickness over a portion of the part layer or the whole part layer, part layer thickness variance over a portion of the part layer or the whole part layer, part layer height from a known reference (e.g., build surface 426) at a point, part layer average height over a portion of the part layer or the whole part layer, part layer height variance over a portion of the part layer or the whole part layer and others. For example, distance sensor 114 may be used to determine part layer thicknesses 412, 414, and 416 for those deposited part layers after each layer is manufactured.

By setting (e.g., slicing) the design layer thickness thinner than the expected thickness of a deposited part layer, and by integrating a distance sensor, a design layer corresponding to the next layer to be manufactured can be selected dynamically rather than sequentially. For example, as depicted in FIG. 4, the first design layer 402 of layered part model 400 may be selected based on a height corresponding with build surface 426 (usually zero). This is depicted in FIG. 4 by selection arrow 428 which indicates how the current part layer height corresponds with a design layer (though in this case there is no part layer yet). Similarly, after the first part layer of partially built part 418 is manufactured (with measured part layer thickness 416), distance sensor 106 may determine the part layer height (with reference to build surface 426) and select an appropriate design layer as indicated with selection arrow 430.

Notably, the design layer 402 selected for the second part layer to be manufactured (as indicated by selection arrow 430) is not the second design layer 402 in layered part model 400, but rather the third design layer 402 in layered part model 400. As such, the selection of design layers is dynamically based on the part layer height of the last part layer manufactured, rather than based on a fixed sequence of design layers, as depicted with reference to FIG. 2.

After the second part layer of partially built part 418 is manufactured (with measured part layer thickness 414), distance sensor 106 may determine the layer height of the second part layer (with reference to build surface 426) and select an appropriate design layer 402 for the third part layer as indicated with selection arrow 432.

After the third part layer of partially built part 418 is manufactured (with measured part layer thickness 412), distance sensor 114 may determine the layer height of the third part layer (with reference to build surface 426) and select an appropriate design layer 402 for the fourth part layer as indicated with selection arrow 434. Notably, the design layer width 408 of the selected design layer 406 corresponding to the fourth part layer to be manufactured results in a fourth part layer with corresponding width 422. By manufacturing the fourth part layer using the maximum selected design layer width 408 of selected design layer 406, the resulting built part 424 does not include any part layer underruns (such as those depicted in FIG. 3). Thus, advantageously, a part built using a higher-resolution layered part model 400 and dynamic layer selection should not need material added to the final built part, which saves time and cost in the manufacturing process. This process may continue as described until a fully built part 424 is completed.

Figure 5:
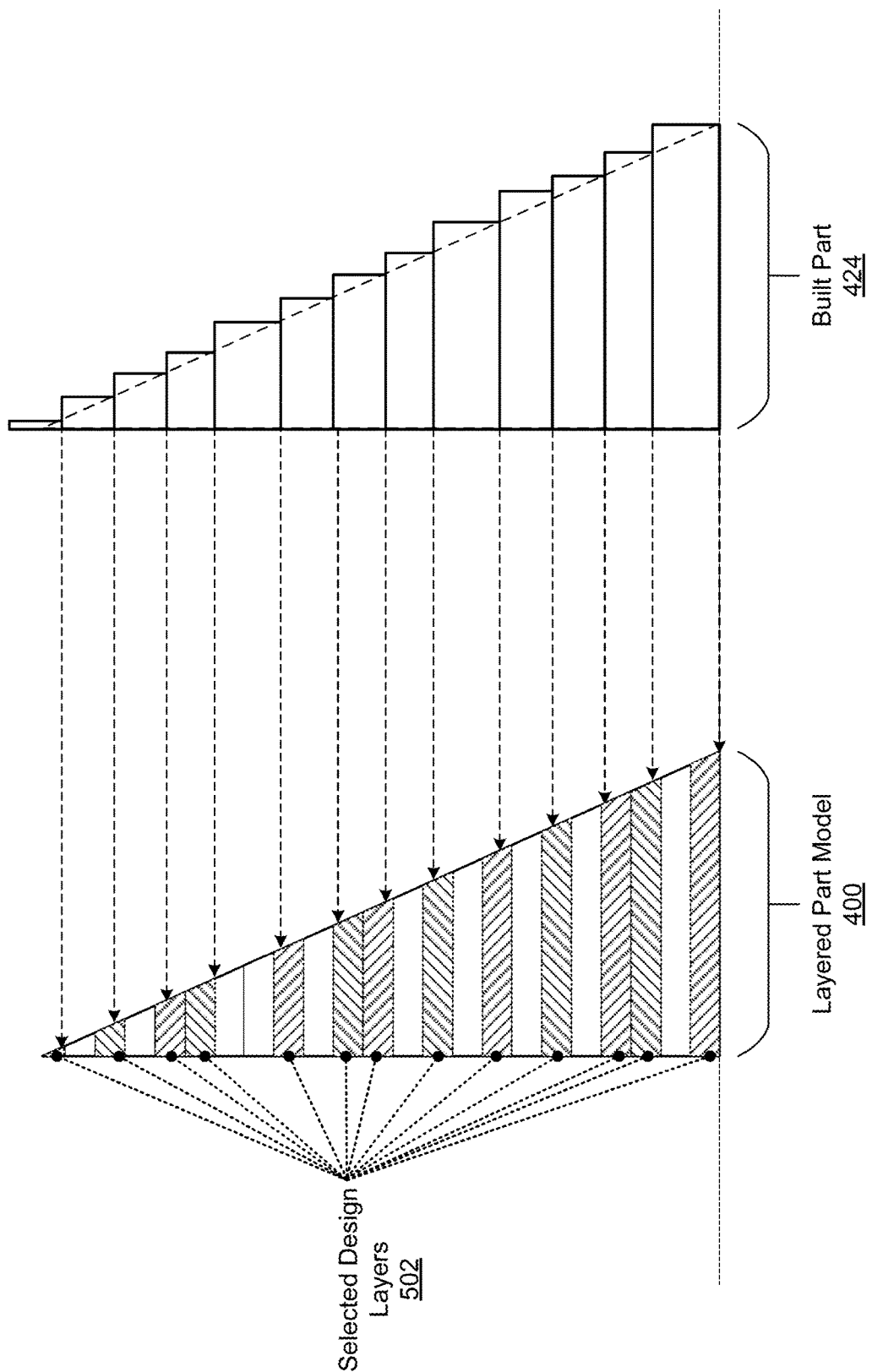
FIG. 5 depicts examples of additive manufacturing processes using a high-resolution layered part model.

FIG. 5 depicts the result of using a high-resolution layered part model 400 and dynamic layer selection. As shown in FIG. 5, only a subset 502 of the total set of design layers are selected during the manufacturing of built part 424. Further, as described above, built part 424 has no layer underruns. Importantly, this improvement in built part result is achieved without any manual measuring of a deposited part layer and without any re-slicing the layered part model to compensate for manufacturing variances.

Figure 6:
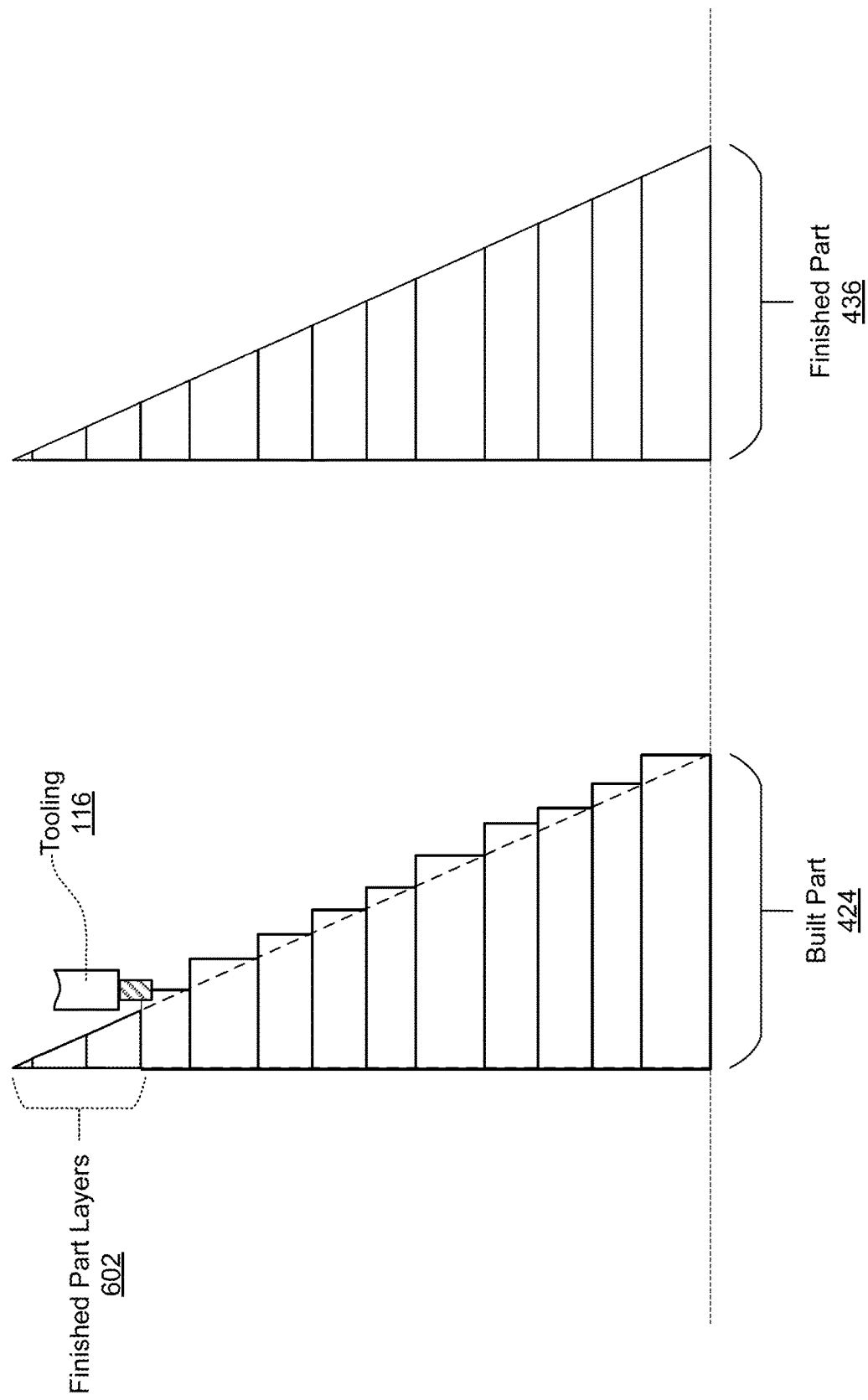
FIG. 6 depicts examples of additive manufacturing processes including finishing steps.

FIG. 6 depicts built part 424 being further refined with tooling 116. For example, the layer overruns (i.e., excess material) may be removed with a subtractive process such as cutting, grinding, ablation or the like with, for example tooling 116, in order to achieve finished part layers 602. In some alternative examples, directed energy source 106 may instead be used to remove excess material. For example, the directed energy source may be focused on portions of built part 424 without feeding any powder in order to remove excess material by ablation. The result of the additional refinement is finished part 436 which corresponds with layered part model 400. Note that the layers shown in finished part 436 are for reference only and may not be visible in an actual finished part.

Built part 424 may also be refined with an additive process such as deposition of material to fill in underruns, gaps, holes, or to plate the finished part with hardened or protective substances or the like.

Figure 7:
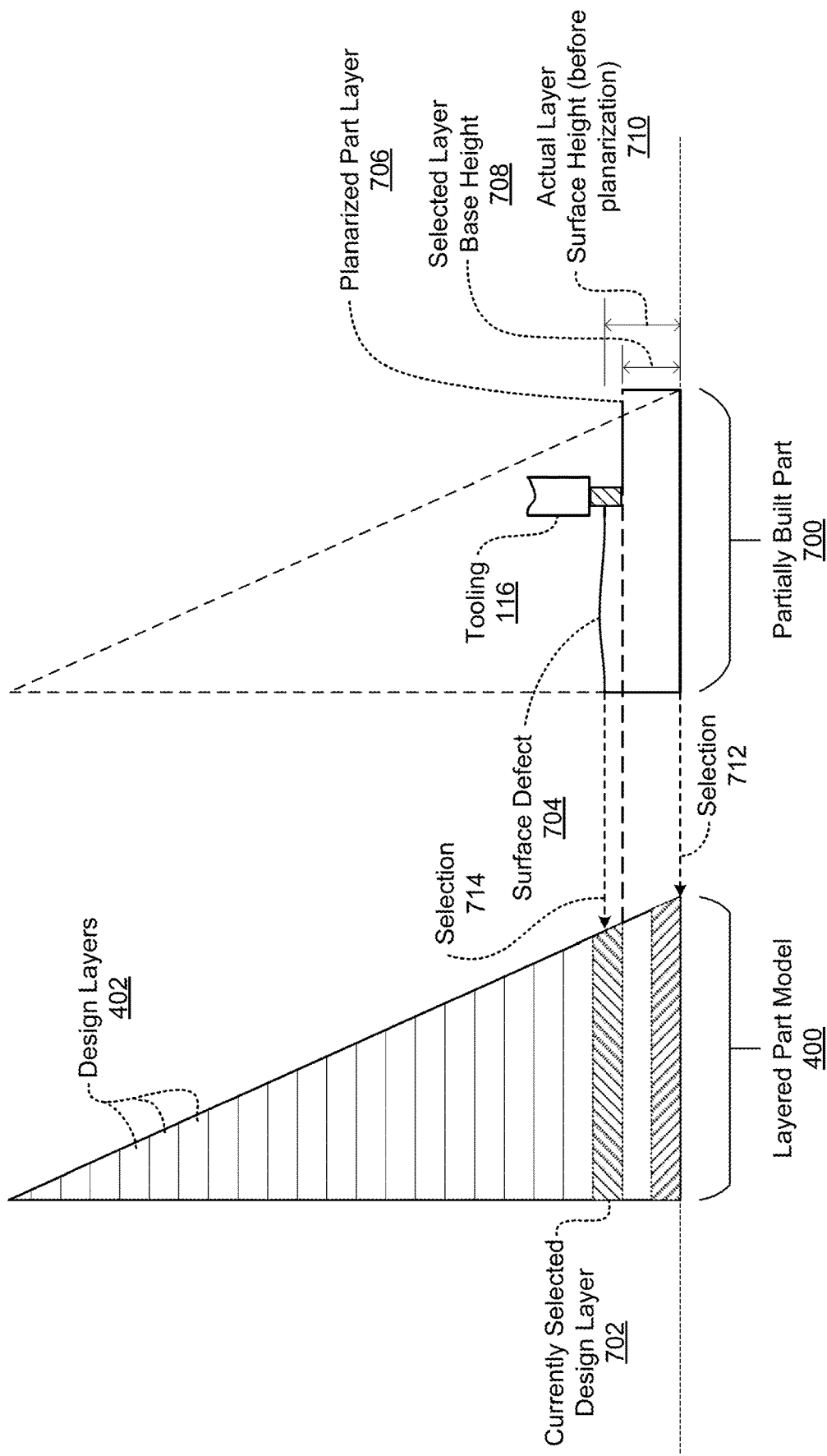
FIG. 7 depicts examples of additive manufacturing processes including layer correction using a high-resolution layered part model.

FIG. 7 depicts a further refinement of methods of additive manufacturing using a high-resolution layered part model 400 and dynamic layer selection. As shown in FIG. 7, a first part layer of partially built part 700 has been manufactured (e.g., deposited) according to a selection 712 of a design layer 402 of layered part model 400. However, the first deposited part layer includes a surface defect 704. Here, surface defect 704 is a wavy, non-planar portion of the surface of the first deposited part layer. In other examples, the surface defect could be any sort of defect, including a high area (e.g. a ridge), a low area (e.g., a valley), a pitted surface, an uneven surface, etc.

As shown in FIG. 7, before manufacturing the second part layer according to the currently selected design layer 702 (based on selection 714), the first part layer is planarized (i.e., made flat) using tooling 116 so that the actual part layer surface height 710 is reduced to the currently selected design layer 702 base height 708. A partially planarized part layer surface 706 is depicted to show the before and after effect of the planarization step. This additional step both mitigates the surface defect 704 and reduces the variance between the next deposited part layer and the layered part model. For example, as compared to the process described with respect to FIG. 4, the additional step in FIG. 7 may further reduce part layer overruns and thus reduce the amount of finishing and material waste necessary to form a finished part.

Surface defects, such as low areas, pits, holes, or the like in a deposited layer may also be corrected by an additive process (e.g., deposition of additional material), such as depositing additional build material on or around the surface defect, or even forming an entire new surface to planarize the deposited layer.

Figure 8:
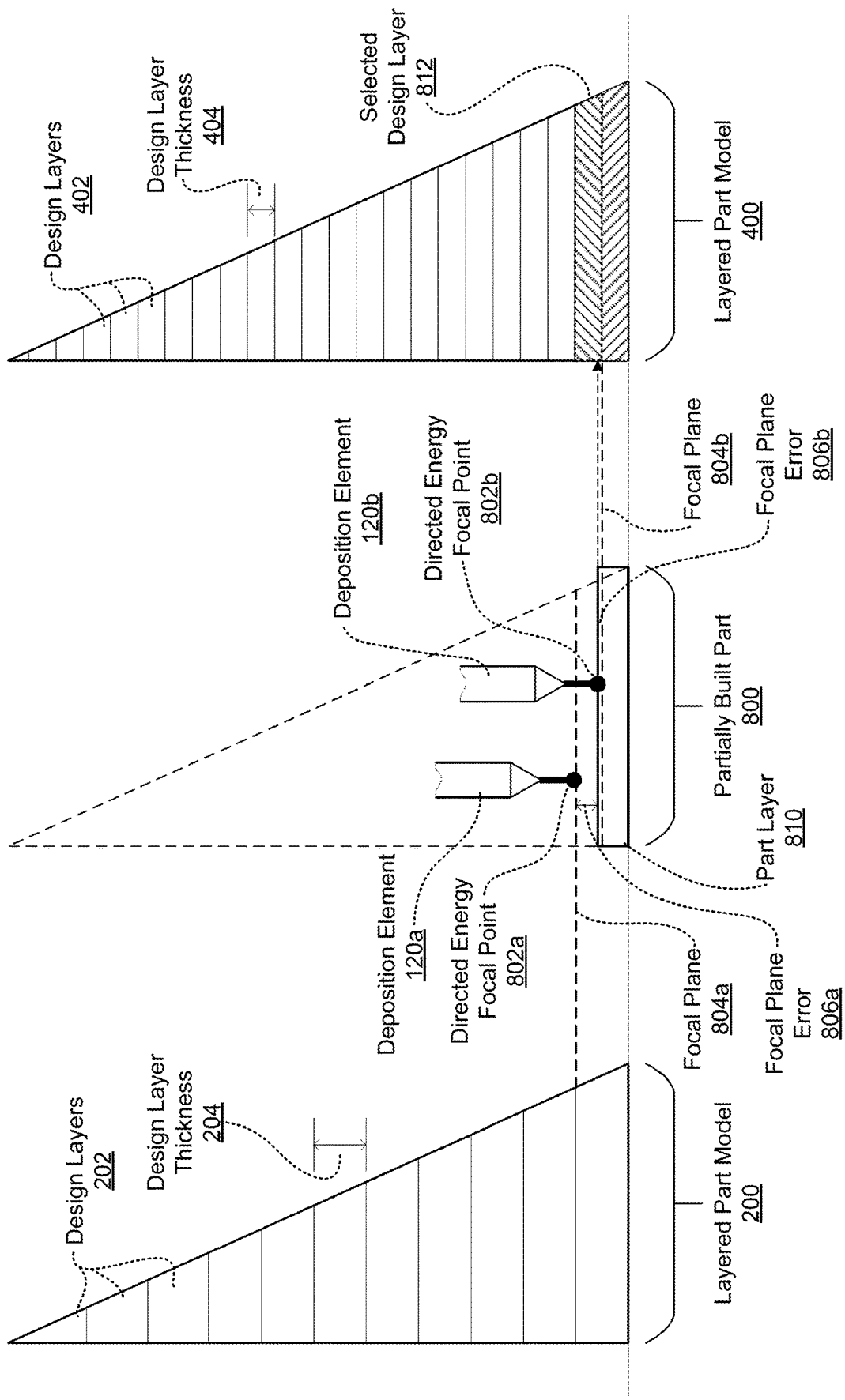
FIG. 8 depicts advantages of additive manufacturing processes using a high-resolution layered part model.

FIG. 8 depicts another advantage of a high-resolution layered part model. In particular, FIG. 8 depicts a difference in the performance of deposition element 120 using a low-resolution layered part model 200 (such as may be used where the design layer height 202 is set approximately to the expected part layer thickness) versus a high-resolution layered part model 400.

As depicted in FIG. 8, part layer 810 may be deposited as part of partially built part 800, but part layer 810 may vary in thickness as compared to the design layer thickness 204 of layered part model 200. When the next layer is to be deposited, deposition element 120a may be moved to a position based on the expected part layer height (based on layered part model 200) rather than the actual layer height of part layer 810. Consequently, directed energy focal point 802a may fall in a focal plane 804a that does not correspond with the actual top of part layer 810 (as depicted by the large focal plane error 806a). Such focal plane errors may negatively impact the deposition of material on part layer 810. For example, the large focal plane error 806a may lead to insufficient heating and binding of the build material to the top of part layer 810, and such error may cascade through subsequent layers.

As another example (not shown in FIG. 8), if the actual height of part layer 810 was higher than expected (based on layered part model 200), the deposition element may be moved to a position too close to the top of part layer 810. Consequently, the directed energy source (e.g., laser) may be out of focus and again cause insufficient heating and binding of the build material on top of part layer 810. In other instances, having the deposition element too close to the surface of part layer 810 may cause ablation of part layer 810. Either of these issues may cascade through further part layers and negatively impact the accuracy, strength, finish, etc. of the final built part or even cause damage to the deposition element by contacting the part.

If, on the other hand, high-resolution part model 400 is used, including the steps of measuring the height of part layer 810 (as discussed, for example, with respect to FIGS. 4 and 5) in order to select an appropriate design layer 812, deposition element 120b will be moved to a more accurate position for the deposition of the next layer. As shown in FIG. 8, the more accurate positioning of deposition element 120b based on the higher resolution layered part model 400 leads to a directed energy focal point 802b in a focal plane 804b that is much closer to the actual part layer 810 surface. Consequently, the focal plane error 806b is minimized and the quality of the subsequent layer deposition is improved. Further, because the process of measuring resulting part layer height and selecting appropriate design layers 402 is iterative, the quality of the built part overall will be greatly improved where there are many part layers in a fully built part.

Notably, design layer thicknesses 204 and 404 are depicted for ease of viewing. The actual disparity in design layer thicknesses in a typical layered part model 200 and a high-resolution part model, such as layered part model 400, may be much greater. As described above with respect to FIG. 4, design layer thickness 404 may be, for example, less than 40%, 30%, 20%, 10% (or other percentages) of the expected part layer thickness.

While the aforementioned discussion regarding FIGS. 1-8 has described layered part models with parallel design layers, the systems and methods described herein are not so limited. For example, because both process motion system 112 and build surface motion system 124 of FIG. 1 are moveable, including in some examples rotatable around one or more axes, a layered part model may include subsets of design layers that are parallel to each other, but not to other subsets of design layers within the part model. For example, after depositing a first set of one or more layers on build surface motion system 124, build surface motion system 124 may rotate about one or more axes in order that a second set of one or more layers may be deposited at an angle compared to the first set. As such, parts formed with multiple sets of non-parallel layers, such as a part formed by a generatrix along a non-linear path (i.e., a directrix), may be built using the systems and methods described herein.

Figure 9:
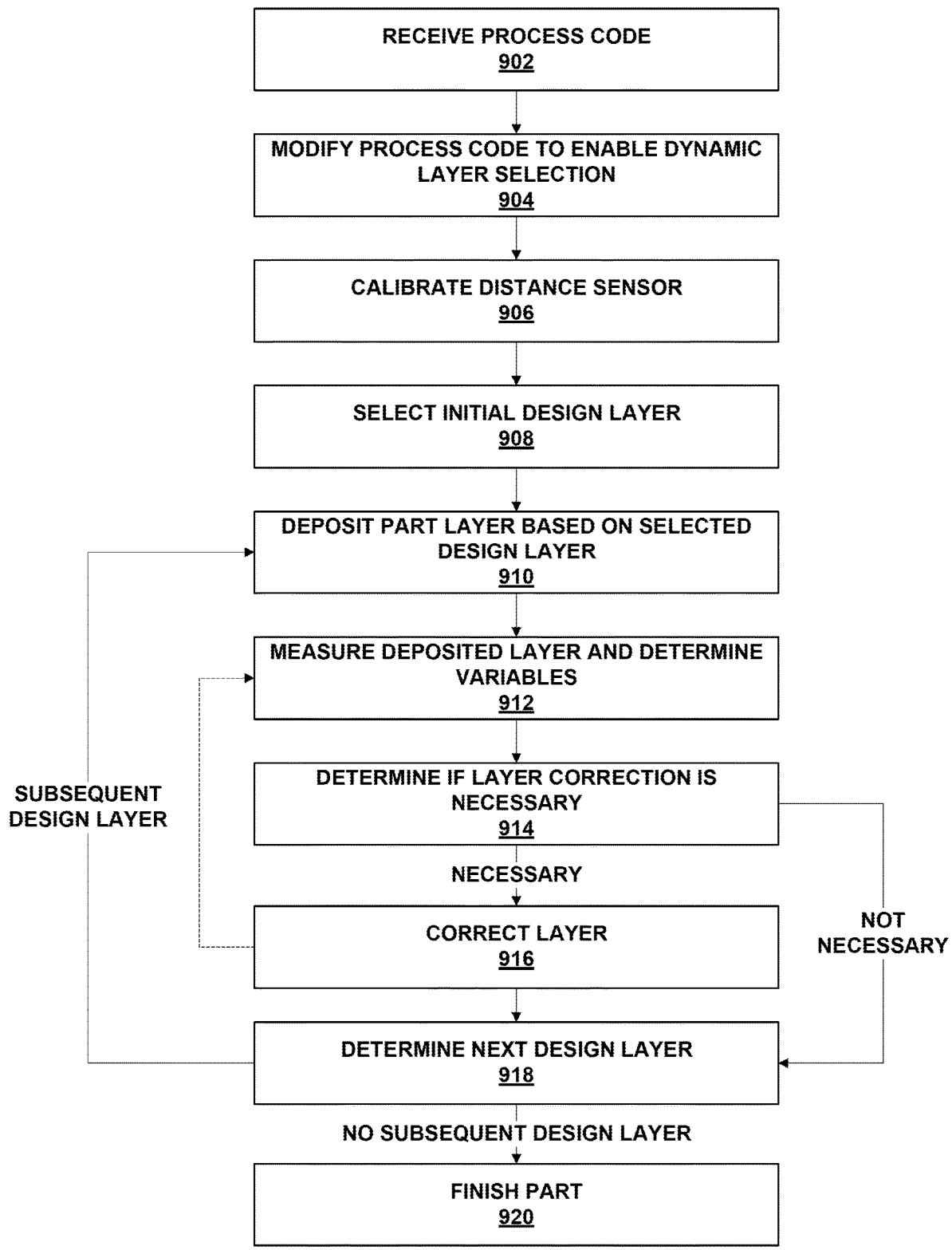
FIG. 9 depicts an example method of additive manufacturing using a high-resolution layered part model.

FIG. 9 depicts a method of additively manufacturing a part using dynamic layer selection. The method begins at step 902, where process code is received at an additive manufacturing system, such as additive manufacturing system 100 of FIG. 1. The process code may be received, for example, via an interface (such as user interface 102 described above with respect to FIG. 1), from a storage local to the additive manufacturing system, or via a removable storage (e.g., a USB drive, CD, DVD, or the like), via a network connection, or by other means.

The process code could be, for example, G-code, computer numeric control (CNC) code, numeric control (NC) code, G&M code, Motion Program code, or the like. The process code may be generated by CAM and/or Slicing Software, such as CAM Software 128 and Slicing Software 130 described with respect to FIG. 1. The process code may be based on a part design, such as a 3D design model created in a software, such as CAD software 126 described with respect to FIG. 1.

The process code may comprise representations of a plurality of design layers that correspond with a part design. In particular, the process code may define design layers that have design layer thicknesses less than, and in some cases significantly less than, the expected thickness of the part layer (as discussed above with respect to FIGS. 4 and 5). The plurality of design layers may thus be considered to have high-resolution with respect to the expected thickness of the part layer.

The method progresses to step 904, where the process code is modified to enable dynamic layer selection. For example, the process code may be modified to include one or more layer variables or flags, which indicates the start and finish of a design layer for manufacturing, and which uniquely identify the design layer. The process code may be further modified to include a tool movement, activation, or deactivation code. For example, the process code may cause to be moved distance sensor 114 or tooling 116, as described with respect to FIG. 1. As another example, the process code may cause to be activated or deactivated directed energy source 106, material feed 108, gas feed 110, distance sensor 114, deposition element 120, tooling 118, and others as described with respect to FIG. 1.

The process code may be modified, for example, manually through user interface 102 (as described with respect to FIG. 1), automatically through control system 104 (as described with respect to FIG. 1), or by separate software means.

In some other examples (not shown), an additive manufacturing system, such as additive manufacturing system 100 described with respect to FIG. 1, may receive process code that is already modified to enable dynamic layer selection thereby obviating the need for step 904. For example, the process code may be automatically generated by CAM Software 128 or Slicing Software 130.

The method then progresses to step 906, where a distance sensor is calibrated. For example, a sensor such as distance sensor 114 described with respect to FIG. 1 could be calibrated by moving the sensor to a known location above a surface, such as a build surface of build surface motion system 124 described with respect to FIG. 1. The sensor may then take measurement data (e.g., determine a sensor voltage) in order to calibrate an exact distance to the build surface. In some examples, step 906 may need to be performed only periodically, intermittently, or not at all, depending on the sensor type and other aspects of the additive manufacturing system. Similarly, while shown as a single step with respect to FIG. 9, the distance sensor may be calibrated multiple times over the course of a single part manufacture. In some examples, control system 104 (as described with respect to FIG. 1) may control the sensor calibration.

The method then progresses to step 908 where an initial design layer is selected. The initial design layer may be, for example, the first design layer in the process code. Alternatively, a design layer with a base height corresponding to the height of the build surface may be selected as an initial design layer. In some examples, control system 104 (as described with respect to FIG. 1) may select the initial design layer.

The method then progresses to step 910 where a part layer is deposited based on the selected design layer. The part layer may be deposited by various additive manufacturing techniques as described above, including, for example, Powder Fed Directed Energy Deposition (PFDED). In some examples, control system 104 (as described with respect to FIG. 1) may control deposition of the part layer.

The method then progresses to step 912, where the deposited part layer is measured by a sensor, such as distance sensor 114 described with respect to FIG. 1. One or more measurements may be gathered (e.g., one or more sensor voltages) in order to determine one or more measurement variables that correspond to characteristics of a deposited part layer. For example, measurement variables may be determined for part layer thickness at a point, average part layer thickness over a portion of the part layer or the whole part layer, part layer thickness variance over a portion of the part layer or the whole part layer, part layer height from a known reference (e.g., a build surface) at a point, part layer average height over a portion of the part layer or the whole part layer, part layer height variance over a portion of the part layer or the whole part layer and others. In some examples, control system 104 (as described with respect to FIG. 1) may control the sensor measurements. In some examples, the measurements (e.g., sensor voltages) may be filtered or otherwise pre-processed before determining the measurement variables.

In some examples, the distance sensor may retrace the deposition path of the deposited part layer and collect a plurality of distance measurements. In other examples, the distance sensor may trace a line over the entire deposition path and collect a plurality of distance measurements. In some examples, the distance sensor may only gather measurements from specific points of the deposited part layer.

The method then progresses to step 914, where it is determined whether a layer correction is necessary. For example, as described above with respect to FIG. 7, it may be determined whether the deposited part layer has any surface defects, such as a high area (e.g. a ridge), a low area (e.g., a valley), a pitted surface, an uneven surface, a wavy surface, etc. In some examples, whether or not a layer correction is necessary may be determined by comparing one or more variables determined in step 912 with one or more related thresholds. For example, if a deposited part layer height or thickness variance exceeds a variance threshold, or exceeds a height threshold, it may be determined that the particular layer needs planarization or other correction. In some examples, control system 104 (as described with respect to FIG. 1) may determine whether a layer correction is necessary.

If at step 914 it is determined that a deposited part layer needs correction, the method progresses to step 916 where the layer is corrected. For example, the layer may be corrected using tooling, for example, as described with respect to FIG. 7.

After correcting the layer in step 916, the method may optionally return to step 912 to obtain further measurements after correction (as indicated by the dashed line connecting steps 916 and 912). For example, the further measurements may be used to determine whether the layer correction was successful, the new height and/or thickness of the corrected layer, etc. In some examples, control system 104 (as described with respect to FIG. 1) may determine whether to perform additional measurements after correction and may control any measurements thereafter.

Alternatively, the method may progress from step 916 to 918 without further measurement. In such cases, the corrected layer height may be determined, for example, based on the tooling performed to the corrected layer. For example, the height of a tool used to planarize the corrected layer may be used to determine the height of a surface of the corrected layer as compared to a known reference (e.g., a build surface).

If at step 914 it is determined that a deposited part layer does not need correction, the method progresses to step 918 where the next design layer is determined.

At step 918, the next design layer may be selected dynamically, for example, based on the height of the last deposited layer as measured in step 912 (or optionally after correction in step 916) as described above with respect to FIGS. 4 and 5. In some examples, the next design layer may be selected from a plurality of indexed design layers based on the design layer thickness and deposited part layer height (e.g., as determined in step 912) such that the next design layer index=deposited part layer height/design layer thickness. For example, if the design layer thickness is 0.1 mm and the deposited part layer height is 0.3 mm, then the next layer index would be 0.3/0.1=3. In examples where the result of the division is not a round number, the next design layer may be selected based on the quotient of the division, by a rounding operation, or by another mathematical operation.

Notably, while the next design layer selected may be the design layer adjacent to the currently selected design layer, it may also be separated by one or more unselected design layers as described above with respect to FIGS. 4 and 5. Thus, the design layer selection is dynamic based on actual manufacturing conditions and not merely sequential based on the layered design model. The modified process code may enable the selection of non-adjacent design layers by, for example, including a command to skip portions of the process code corresponding to unselected design layers. More specifically, a determined layer index, as described above, may be used to go to a specific portion of the process code corresponding to the determined next design layer.

In some examples, control system 104 (as described with respect to FIG. 1) may select the next design layer.

If at step 918 it is determined that there is a subsequent design layer to be deposited, the method returns to step 910. If, on the other hand, it is determined that there is not a subsequent design layer to be deposited, the method progresses to step 920. In some examples, control system 104 (as described with respect to FIG. 1) may determine whether or not there is another design layer to be deposited.

At step 920, the part is finished. For example, the part may be tooled as described above with respect to FIG. 6. In some examples, control system 104 (as described with respect to FIG. 1) may control the finishing of the part.

Though not shown in FIG. 9, the method may include an additional step after tooling in step 920 of measuring the finished part using the distance sensor. In this way, the accuracy of the finished part compared to the part design may be established. In some examples, control system 104 (as described with respect to FIG. 1) may control further measurement of the finished part.

Figure 10:
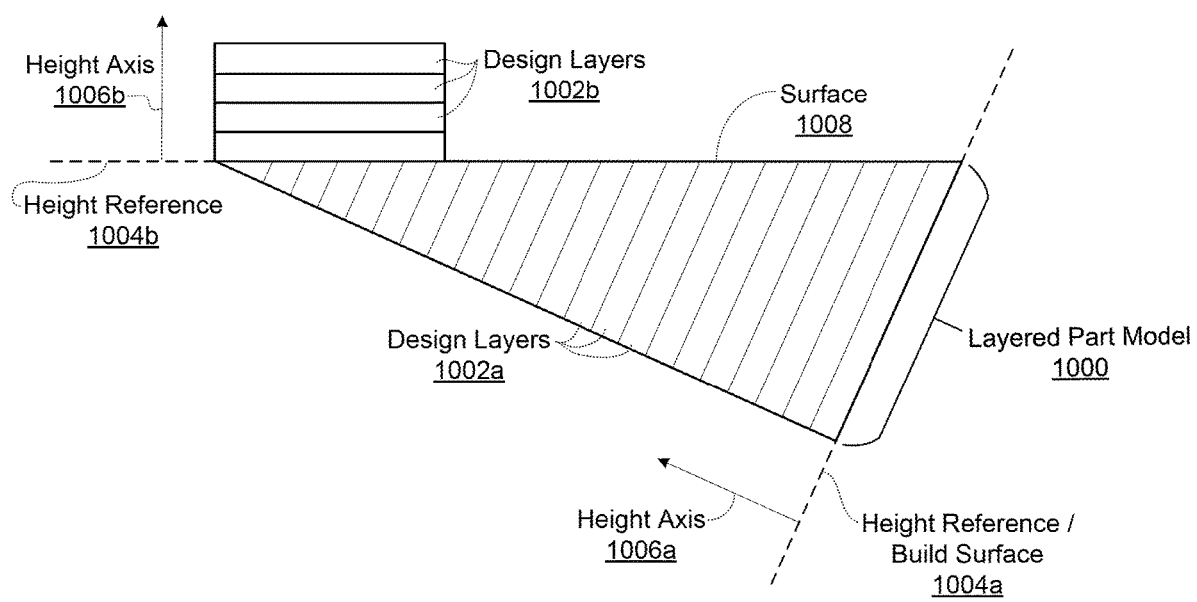
FIG. 10 depicts an example of building a part with a high-resolution layered model including multiple height reference planes.

FIG. 10 depicts an example of building a part with a high-resolution layered model including multiple height reference planes. In particular, design layer model 1000 includes two sets of non-parallel design layers 1002a and 1002b. Design layers 1002a are parallel with a height reference plane 1004a, which in this example may also be a build surface, such as that of build surface motion system 124 described with respect to FIG. 1. Thus, the steps of determining the height of deposited part layers corresponding with design layers 1002a (as described above) may be performed with reference to height reference 1004a along a height axis 1006a, which in this example corresponds with a build surface of build surface motion system 124.

Similarly, the steps of determining the height of deposited part layers corresponding with design layers 1002b (as described above) may be performed with reference to height reference plane 1004b (here not the build surface) along a height axis 1006b. Here, height reference plane 1004b is a "virtual height reference plane" i.e., a plane that does not correspond with the actual, movable build surface. Virtual height reference planes may nevertheless correspond with part surfaces, such as surface 1008. Thus, a single part design model may have multiple layer height references with respect to which parallel layers of a part are built. This is possible because of the ability to move one or more of the process motion system 112 and the build surface motion system 124, as described above. Accordingly, the methods described above may be applied to layered part models with multiple layer height references, including virtual or part-surface based height references.

The terms "about" and "substantially" are used herein with respect to measurable values and ranges due to expected variations known to those skilled in the art (e.g., limitations and variabilities in measurements).

Although the present disclosure has been described with reference to preferred examples, persons skilled in the art will recognize that changes may be made in form and detail without departing from the spirit and scope of the disclosure.

What is claimed is:

1. An additive manufacturing method, comprising:
   receiving process code at an additive manufacturing apparatus defining a plurality of design layers of a part model, wherein:
      a thickness of each respective design layer of the plurality of design layers is less than an expected thickness of a deposited material layer from the additive manufacturing apparatus, and
      the plurality of design layers comprise all design layers of the part model;
   obtaining, from a sensor, a calibration measurement, the calibration measurement indicating a distance from the sensor to a build surface of the additive manufacturing apparatus;
   selecting a current design layer from a plurality of design layers of the part model;
   depositing, from a deposition element of the additive manufacturing apparatus, a first material layer of a part corresponding to the current design layer of the part model, wherein the first material layer is thicker than the thickness of the current design layer;
   obtaining, from the sensor, a plurality of material layer measurements, each of the material layer measurements indicating a distance from the sensor to the first material layer;
   determining, based on the plurality of material layer measurements and the calibration measurement, a height metric, wherein the height metric is a median height of the first material layer relative to the build surface;
   selecting a new design layer from the plurality of design layers of the part model based on the height metric;
   determining a maximum width of the new design layer; and
   depositing, from the deposition element of the additive manufacturing apparatus, a second material layer of the part corresponding to the selected new design layer of the part model and having a width at least equal to the determined maximum width of the new design layer.

2. The additive manufacturing method of claim 1, further comprising: modifying the process code to include a plurality of layer flags, each layer flag being configured to uniquely identify a respective design layer of the plurality of design layers of the part model.

3. The additive manufacturing method of claim 2, further comprising:
   determining that no more design layers need to be deposited; and
   finishing the part by removing material from the part using a tool of the additive manufacturing apparatus.

4. The additive manufacturing method of claim 3, further comprising: identifying, based on at least one material layer measurement of the plurality of material layer measurements, a portion of the first material layer that requires correction.

5. The additive manufacturing method of claim 4, further comprising: removing material from the portion of the first material layer that requires correction using the tool of the additive manufacturing apparatus.

6. The additive manufacturing method of claim 1, wherein the sensor is a laser distance sensor.

7. The additive manufacturing method of claim 1, wherein:
   the additive manufacturing apparatus is a Powder Fed Directed Energy Deposition apparatus, and
   the deposition element comprises a deposition nozzle or a feedstock guide.

8. The method of claim 1, wherein there is at least one intervening design layer in the part model between the selected new design layer and the current design layer.

9. The method of claim 1, wherein the thickness of each respective design layer of the plurality of design layers is less than 20% of the expected thickness of the deposited material layer from an additive manufacturing apparatus.

10. The method of claim 1, wherein:
    a first group of parallel material layers comprises the first material layer, and
    the method further comprises:
       defining a virtual height reference plane that intersects a build surface plane;
       depositing, from the deposition element of the additive manufacturing apparatus, a second material layer of the part corresponding to the selected new design layer of the part model and parallel to the virtual height reference;
       obtaining, from the sensor, a second plurality of material layer measurements, each of the second material layer measurements indicating a distance from the sensor to the second material layer; and
       determining, based on the second plurality of material layer measurements, a second height metric, wherein the second height metric is a median height of the second material layer relative to the virtual height reference.

11. An additive manufacturing apparatus, comprising:
a user interface;
a deposition element;
a directed energy source;
a material feed;
a process motion system;
a build surface motion system comprising a build surface;
a distance sensor;
a tool configured to remove material from a part being manufactured;
a memory comprising a plurality of design layers representing a part to be additively manufactured; and
a control system, wherein the control system is configured to execute program code and cause the additive manufacturing apparatus to:
  receive process code at an additive manufacturing apparatus defining a plurality of design layers of a part model, wherein:
    a thickness of each respective design layer of the plurality of design layers is less than an expected thickness of a deposited material layer from the additive manufacturing apparatus, and
    the plurality of design layers comprise all design layers of the part model;
  obtain, from the distance sensor, a calibration measurement, the calibration measurement indicating a distance from the distance sensor to the build surface of the additive manufacturing apparatus;
  select a current design layer from the plurality of design layers of a part model;
  deposit, from the deposition element, a first material layer of a part corresponding to the current design layer of the part model, wherein the first material layer is thicker than the thickness of the current design layer;
  obtain, from the distance sensor, a plurality of material layer measurements, each of the material layer measurements indicating a distance from the distance sensor to the material layer;
  determine, based on the plurality of material layer measurements and the calibration measurement, a height metric, wherein the height metric is a median height of the first material layer relative to the build surface; and
  select a new design layer from the plurality of design layers of the part model based on the height metric;
  determine a maximum width of the new design layer; and
  deposit, from the deposition element of the additive manufacturing apparatus, a second material layer of the part corresponding to the selected new design layer of the part model and having a width at least equal to the determined maximum width of the new design layer.

12. The additive manufacturing apparatus of claim 11, wherein the control system is further configured to cause the additive manufacturing apparatus to: modify the process code to include a plurality of layer flags, each layer flag being configured to uniquely identify a respective design layer of the plurality of design layers of the part model.

13. The additive manufacturing apparatus of claim 12, wherein the control system is further configured to cause the additive manufacturing apparatus to:
  determine that no more design layers need to be deposited; and
  finish the part by removing material from the part using the tool.

14. The additive manufacturing apparatus of claim 13, wherein the control system is further configured to cause the additive manufacturing apparatus to: identify, based on at least one material layer measurement of the plurality of material layer measurements, a portion of the first material layer that requires correction.

15. The additive manufacturing apparatus of claim 14, wherein the control system is further configured to cause the additive manufacturing apparatus to: remove material from the portion of the material layer that requires correction using the tool.

16. The additive manufacturing apparatus of claim 11, wherein additive manufacturing apparatus is a Powder Fed Directed Energy Deposition apparatus.

17. The additive manufacturing apparatus of claim 11, wherein the distance sensor is a laser distance sensor.

* * * * *